(12) United States Patent
Fox (10) Patent No.: US 6,253,187 B1
(45) Date of Patent: Jun. 26, 2001

(54) INTEGRATED INVENTORY MANAGEMENT SYSTEM

(75) Inventor: Billy Shane Fox, Dallas, TX (US)

(73) Assignee: Maxagrid International, Inc., Addison, TX (US)

( * ) Notice: Subject to any disclaimer, the term of this patent is extended or adjusted under 35 U.S.C. 154(b) by 0 days.

(21) Appl. No.: 09/215,779

(22) Filed: Dec. 18, 1998

Related U.S. Application Data (63) Continuation-in-part of application No. 09/143,586, filed on Aug. 31, 1998.
(60) Provisional application No. 60/110,990, filed on Dec. 3, 1998.

(51) Int. Cl.⁷ .............................. G06F 17/60; G06F 17/30
(52) U.S. Cl. ............................... 705/10; 705/10; 705/28; 705/29; 707/103; 707/104
(58) Field of Search .................................. 705/8, 10, 25, 705/29, 30, 14, 15, 26–28, 35, 34, 40; 707/104, 102, 103

(56) References Cited

U.S. PATENT DOCUMENTS

| | | | |
|---|---|---|---|
| 3,605,089 | * 9/1971 | Gray | 340/172.5 |
| 3,651,478 | * 3/1972 | Shandlay | 340/172.5 |
| 4,025,766 | * 5/1977 | Ng et al. | 235/152 |
| 4,509,123 | * 4/1985 | Vereen | 364/300 |
| 4,700,295 | * 10/1987 | Katsof et al. | 705/28 |
| 5,216,594 | * 6/1993 | White et al. | 705/28 |
| 5,241,467 | * 8/1993 | Failing et al. | 705/28 |

(List continued on next page.)

OTHER PUBLICATIONS

Pricing and Inventory Management in Today's Broadcast Environment, by Shane B. Fox, Broadcast Revue Management, National Association of Broadcasters, 1997.

(List continued on next page.)

*Primary Examiner*—Kim Vu
*Assistant Examiner*—Shahid Alam
(74) *Attorney, Agent, or Firm*—Philip G. Meyers; Philip G. Meyers Intellectual Property Law, P.C.

(57) ABSTRACT

A method is provided for inventory management which includes an initial step of receiving a customer request for an inventory item and then generating a table or menu of one or more inventory items that most closely correspond to the customer request using a price forecasting system. Based on negotiations concerning price, timing and other typical concerns, an item is selected from the table and a price quotation associated with the selected inventory item is generated using the price forecasting system, which price quotation has been predetermined by a yield management system using a pricing strategy. The customer information associated with the customer request is input into a traffic billing system. Information needed for price recalculation associated with the customer request is input into the yield management system. The yield management system recalculates pricing data with in a manner consistent with a pricing strategy implemented by the yield management system, so that price changes caused by a reduction in available inventory due to the customer request are taken into account, and the pricing data accessed by the price forecasting system when a price quotation is generated is updated prior to repeating the process for a subsequent customer request. This method provides more accurate pricing than known systems where order information must be entered manually before a price recalculation can take place, and the yield management system overestimates the amount of available inventory. If the customer request comprises a reservation having an associated probability of later becoming an order, the reservation is taken into account when recalculating prices based on available inventory. Such a process may be integrated for an enterprise made up of a number of member stations each having associated inventory for sale.

19 Claims, 6 Drawing Sheets

U.S. PATENT DOCUMENTS

| | | | |
|---|---|---|---|
| 5,383,112 | * | 1/1995 | Clark .................................. 705/28 |
| 5,594,899 | * | 1/1997 | Knudsen et al. ...................... 707/2 |
| 5,615,109 | * | 3/1997 | Eder .................................. 395/208 |
| 5,630,121 | * | 5/1997 | Braden-Harder et al. ............ 707/4 |
| 5,712,989 | * | 1/1998 | Johnson et al. ..................... 705/28 |
| 5,758,328 | * | 5/1998 | Giovannoli ......................... 705/26 |
| 5,758,329 | * | 5/1998 | Wojcik et al. ...................... 705/28 |
| 5,761,432 | * | 6/1998 | Bergholm et al. .................. 709/226 |
| 5,765,143 | * | 6/1998 | Sheldon et al. ..................... 705/28 |
| 5,771,172 | * | 6/1998 | Yamamato et al. ................. 705/28 |
| 5,848,399 | * | 12/1998 | Burke ................................. 705/27 |
| 5,854,746 | * | 12/1998 | Yamamato et al. ............... 700/106 |
| 5,870,733 | * | 2/1999 | Bass et al. ........................... 705/2 |
| 5,960,414 | * | 9/1999 | Rand et al. .......................... 705/28 |

OTHER PUBLICATIONS

Pricing & Rate Forecasting Using Broadcast Yield Management, by Shane Fox, National Association of Broadcasters, 1992.

Bonal, J et al., "Productivty improvement driven by an integrated manufacturing system", International Symposium on Semiconductor Manufacturing , 1995, IEEE/UCS/SEMI, Sep. 17–19, 1995, p. 9.*

Mattis, W. E. et al., "A new modem structure for data transmission", IEEE Transaction on Consumer Electronics, Nov. 1993, vol. 39, Issue 4, pp. 878–886.*

Takahashi, Tomokazu et al., "Multiple Line–Segments Regression for Stock Prices and Long–range Forecasting System by Neural Network", Proceedings of the 37th SICE Annual Conference pn International Session Papers, SICE '98, Jul. 2–31, 1998, pp. 1127–1132.*

* cited by examiner-

| Sales Proposal | | | | | | | _ □ × |
|---|---|---|---|---|---|---|---|
| Stations | Grid View | Scheduled Details | Class Details | | | | |
| Multi-Station Selection, Stations Loaded: 4 | | | | | | | |

| Time | Mon | Tue | Wed | Thu | Fri | Sat | Sun |
|---|---|---|---|---|---|---|---|
| WPXA-TV 12:00A-01:00A | $40 [16] | $10 [12] | $10 [12] | $10 [12] | $10 [12] | $10 [12] | $105 [16] |
| WPXA-TV 01:00A-03:00A | $10 [1] | $10 [1] | $10 [1] | $10 [1] | $10 [1] | $10 [1] | $10 [1] |
| WPXA-TV 03:00A-06:00A | $10 [1] | $10 [1] | $10 [1] | $10 [1] | $10 [1] | $10 [1] | $10 [1] |
| WPXH-TV 05:00A-06:00A | $10 [1] | $10 [1] | $10 [1] | $10 [1] | $10 [1] | $10 [1] | $10 [1] |
| WPXH-TV 06:00A-06:30A | $75 [1] | $75 [1] | $75 [1] | $75 [1] | $75 [1] | $10 [1] | $10 [1] |
| WPXH-TV 06:30A-07:00A | $75 [1] | $75 [1] | $75 [1] | $75 [1] | $75 [1] | | |
| WPXH-TV 07:00A-08:00A | $30 [12] | $30 [12] | $30 [12] | $30 [12] | $30 [12] | $10 [1] | $10 [1] |
| WPXH-TV 08:00A-08:30A | $75 [1] | $75 [1] | $75 [1] | $75 [1] | $75 [1] | $10 [1] | $10 [1] |
| WPXH-TV 08:30A-09:00A | $75 [1] | $75 [1] | $75 [1] | $75 [1] | $75 [1] | | |
| WPXH-TV 09:00A-09:30A | $75 [1] | $75 [1] | $75 [1] | $75 [1] | $75 [1] | $125 [1] | $125 [1] |
| WPXH-TV 09:30A-10:00A | $75 [1] | $75 [1] | $75 [1] | $75 [1] | $75 [1] | $125 [1] | $125 [1] |
| WPXH-TV 10:00A-10:30A | $75 [1] | $75 [1] | $75 [1] | $75 [1] | $75 [1] | $125 [1] | $125 [1] |

| Forecast Combos | Flighted Week(s) | Display Options & Scheduled Summary |
|---|---|---|
| WPXA-TV, Atlanta, 01. M-F 6A-7A | 1 Wk, 1 Sgmt | Flighted Rates |
| WPXA-TV, Atlanta, 02. M-F 7A-7:30A | 1@12/07/98 | |
| WPXA-TV, Atlanta, 03. M-F 7:30A-8A | End of List | WPXA-TV, Atlanta |
| | | ☐ Avg. Rate / Cost Round Up |
| Auto Schedule Stations | | ------ Current Grid View Schedule ------ |
| *Select Grid Cells for Scheduling* | 0 | Select Weeks | Clear | Per Wk | Add Select'd | Add All |

| Point to control for quick help tip. | Options | Print | Close |

Fig. 10

INTEGRATED INVENTORY MANAGEMENT SYSTEM

This application is a conversion from U.S. Provisional Application No. 60/110,990, filed Dec. 3, 1998. This application is a continuation-in-part of U.S. Ser. No. 09/143,586, filed Aug. 31, 1998.

TECHNICAL FIELD

The present invention relates to management of media commercial inventory, and more particularly to a system and method for handling intermittent placement of orders and reservations for media commercial time by advertisers, agencies, and customers while optimizing the sale value of the remaining media commercial inventory available for sale to advertisers, agencies, and customers.

BACKGROUND OF THE INVENTION

Media properties include broadcast stations such as television and radio stations and other media such as cable television systems. The process by which media properties provide a rate quote to an advertiser for commercial inventory, which inventory is expressed in a units currency measured in seconds, is much different from the process used by other industries. This difference is due almost exclusively to the type and quality of information pertaining to the value of available inventory, at a particular moment in time, relative to other available inventory. Clearly, the same unit of inventory has a much different value depending upon when the inventory is required by a customer, and from a broadcast station's perspective, the likelihood that the particular unit of inventory can be sold at a later date for at least as much revenue, relative to all other remaining units for sale, and the likelihood that those units will be sold at a later date by the broadcast station.

At any particular moment, there are various quantities of inventory available by program and time segment for future sale. At the moment that a specific customer requests prices and whether inventory is available, it is important that inventory optimization take place from the station's perspective so as to maximize total station revenues. However, the broadcast industry has, to a great extent, been confused as to the meaning of optimization. The term optimization has been used almost exclusively to define parameters from the buyer's perspective, and not the broadcast station. Usually, the buyer will instruct the station to "take my budget and make it go as far as you can, given the parameters I give you." The remaining time inventory and its significance to the station has not been considered, because there has been no meaningful approach which quantifies the value of remaining commercial availability or which provides inventory information from the broadcast station's perspective to its sales personnel.

A need persists for a process to provide information to broadcast station personnel as to the real value of remaining commercial units with respect to each other, at a particular moment in time, given the probability of sale relative to total time period availabilities. There is also a need for an inventory optimization process to determine available inventory at a particular moment in time. Such a process must provide an opportunity for broadcast station personnel to know instantly which broadcast program, days and time segments are necessary to meet a customer's request based upon the needs of the station in terms of inventory optimization. Such a process must identify the value of remaining inventory at the time of the availability request, as the inventory relates to total original capacity for each program or time segment available for sale at a designated cost efficiency parameter.

These functions depend in large part on the manner in which the inventory management system calculates the value of a future program (TV) or time segment (radio). Commercially available inventory management systems such as the Maxagrid system include a yield management system which produces a pricing forecast used to determine prices for sales of commercial time based on factors such as past trends and performance data which are updated periodically in order to maintain an accurate pricing model. See generally *Pricing & Rate Forecasting Using Broadcast Yield Management*, B. Shane Fox, published by the National Association of Broadcasters, 1992, and *Broadcast Revenue Management: Pricing Inventory Management in Today's Broadcast Environment*, B. Shane Fox, published by the National Association of Broadcasters, 1997. These results can be further improved by employing an inventory utilization index ("IUI") when ranking time for sale as described in applicant's U.S. Ser. No. U.S. Ser. No. 09/143,586, filed Aug. 31, 1998, the contents of which are incorporated by reference herein for all purposes. The valuations generated by the yield management system are then input to a price forecasting system which is the part of the Maxagrid software which provides a user interface for a salesperson generating rate quotations for a customer. However, even with a sophisticated approach to valuation of inventory and price forecasting, the results are limited by the accuracy of available data concerning time already sold or likely to be sold.

Media property traffic billing systems commercially available from sources such as Marketron, Columbine/JDS, CBSI, Datacount, and Computer Concepts book orders for commercial time, maintain advertising schedules, and perform related accounting functions. According to present practice, a media property using a yield management system such as the Maxagrid system generates an order which results in a confirmation, generally in printed form, that is printed out for the stations records and a copy mailed to the customer. Eventually, the order is manually entered into the traffic billing system, generally in a batchwise fashion, and subsequently the traffic billing system generates a file of order data which is imported into the yield management system. The yield management system, receiving an update from the traffic billing system, then recalculates the number of commercial units or minutes available for sale by program or time period and the resulting change in the pricing forecast, which is then input to the price forecasting system.

Due to the need to enter order data manually into the traffic billing system and the subsequent delay in updating the pricing forecast several steps later, or a delay in receiving information from the traffic billing system, there is a serious risk that an order will be placed using inaccurate availability and pricing forecast data. This may be simply a conflict over available time, i.e., selling the same time twice or overbooking for a particular program, or a more subtle problem in charging too little for a program which has in fact moved to a higher price point along a demand curve generated by the inventory management system because of orders that have already been placed but have not yet been taken into account in the pricing forecast. There is, therefore, a need for a system that can improve pricing accuracy by providing automatic updating of the pricing forecast, so that in an optimum state the effect of each order on the pricing forecast is taken into account before the next order is placed. The present invention addresses this need.

A second key factor towards enhancing the accuracy of a pricing forecast is taking into account reservations made by customers who want to hold a future time slot for future use but do not place a firm order until much nearer the time of the broadcast. Presently available systems do not take reservations or historically repeated last minute time purchases into account, further distorting the actual value of the time inventory. A comparable problem is presented by allocation of program time to large advertisers that wish to reserve large amounts of time in many small blocks.

The present invention also concerns the needs of an enterprise attempting to manage a number of media properties, especially in different markets. According to present practice, each station is responsible for producing a weekly, monthly, and annual revenue forecast, which is then sent as hard copy to the parent entity. This results in "revenue flash" reports coming in at different times that must all be compiled and the end result calculated. Presently available systems also fail to allow a multi-station enterprise to manage time inventory on a regional or geographic market basis, rather than as individual stations.

SUMMARY OF THE INVENTION

In accordance with a first aspect of the present invention, a method is provided for inventory management which includes an initial step of receiving a customer request for an inventory item and then generating a table or menu of one or more inventory items that most closely correspond to the customer request using a price forecasting system. Most typically the inventory item is associated with a future event, such as an available advertising time associated with a specific time period or program. Based on negotiations concerning price, timing, programming mix and other typical concerns, an item (or items) is/are selected from the table and a price quotation associated with the selected inventory item(s) is generated using the price forecasting system; the price quotation has been predetermined by a yield management system using a pricing strategy. The customer information associated with the customer request is input into a traffic billing system. Information needed for price recalculation associated with the customer request is input into the yield management system. The yield management system recalculates pricing data within a manner consistent with a pricing strategy implemented by the yield management system, so that price changes caused by a reduction in available inventory due to the customer request are taken into account, and the pricing data accessed by the price forecasting system when a price quotation is generated is updated prior to repeating the process for a subsequent customer request. This method provides more accurate pricing than known systems where order information must be entered manually before a price recalculation can take place, and the yield management system consistently overestimates the amount of available inventory. According to a preferred aspect of this method, in the event changes are later made to the customer's order information stored in the traffic billing system, data reflecting the changes is forwarded from the traffic billing system to the yield management system, and the pricing data is recalculated by the yield management system in a manner consistent with a pricing strategy implemented by the yield management system so that price changes caused by the change in available inventory due to the change to the customer's order are taken into account.

An inventory management system for carrying out this process includes a price forecasting system for generating a table of inventory items that meet specified customer request criteria, a yield management system for generating and maintaining true availability and inventory pricing information for use by the price forecasting system in accordance with a pricing strategy, a traffic billing system for generating confirmations of orders for inventory and for maintaining scheduling, processing and accounting information in data files relating to such orders, and a process for recalculating pricing data with the yield management system in a manner consistent with the pricing strategy implemented by the yield management system so that price changes caused by a change in available inventory can be taken into account, wherein the recalculating system is configured to operate with sufficient frequency such that the effect of each customer order on pricing is taken into account before a price quote for a subsequent customer order is generated. Where each of the price forecasting system, yield management system and traffic billing system are separate software modules, data passes automatically between these systems so that updating of the related data files containing inventory and order information is completed prior to the next use of the system in response to the next customer request. However, a slight delay in updating may also be acceptable because the impact of any one transaction on the overall pricing strategy is not usually great.

A second aspect of the invention provides a method for management of inventory items associated with future events, such as ad time segments. As before, the method includes steps of (a) receiving a customer request for an inventory item, (b) generating a table one or more inventory items that most closely correspond to the customer request using a price forecasting system, (c) selecting an item from the table, and (d) generating a price quotation associated with the selected inventory item using the price forecasting system. Next, it is determined if the customer request comprises an order for which the customer is expected to pay, or a reservation of the selected inventory item, which reservation has an associated probability of later becoming an order. Information is stored, e.g, in a data file on a hard drive or similar storage medium, describing the customer request, including an indication of whether the request is an order or reservation. Information needed for price recalculation associated with the customer request is input into the yield management system. This information can vary depending on the pricing strategy the yield management system employs, but preferably includes the amount of time sold and the identity of the time or program segment, including the station name and date. The pricing data is recalculated with the yield management system in a manner consistent with a pricing strategy implemented by the yield management system, so that price changes caused by a reduction in available inventory due to the customer order or reservation are taken into account. This represents a departure from prior practice in which reservations were not taken into account until such reservations matured into orders. According to a preferred form of this method, the recalculation is made in a manner that assigns reservations less weight than orders in making such recalculation, especially a weight proportional to an estimated probability that the reservation will later result in an order. An inventory management system corresponding to this method provides suitable software for entering, storing, retrieving data concerning reservations in a manner consistent with the described steps.

According to a third feature of the invention, an inventory management system is provided for an enterprise made up of a number of member stations each having associated inventory for sale. As before, such a system includes a price forecasting system for generating a table of one or more inventory items that meet specified customer request criteria, a yield management system for generating and maintaining inventory pricing information for use by the price forecasting system in accordance with a pricing strategy, and a traffic billing system for generating confirmations of orders for inventory and for maintaining scheduling, processing and accounting information in data files relating to such orders. In addition, a system is provided for accessing inventory information of multiple stations in response to a customer request so that the table of inventory that meets the specified customer criteria can include inventory items from some or all member stations which meet such criteria. Such a system preferably involves a network that permits such information to be accessed and shared from each station location as well as a headquarters location, and may be centralized or decentralized as described hereafter. A system for accessing traffic billing system information in order to generate a revenue projection for some or all member stations is also included, with or without the capability of accessing multiple station inventory data in response to a customer request.

For purposes of the invention, references to a "system" cover software or any hardware device which has been programmed to perform the same function, but does not include a human being attempting to perform the task or function manually. These and other aspects of the invention are discussed in the detailed description that follows.

BRIEF DESCRIPTION OF THE DRAWING

For a more complete understanding of the invention and for further advantages thereof, reference is now made to the following description of preferred embodiments taken in conjunction with the accompanying drawing, in which:

FIGS. 9 and 10 are diagrams of user screens for an enterprise inventory management system according to the invention.

DESCRIPTION OF THE PREFERRED EMBODIMENTS

Figure 1:
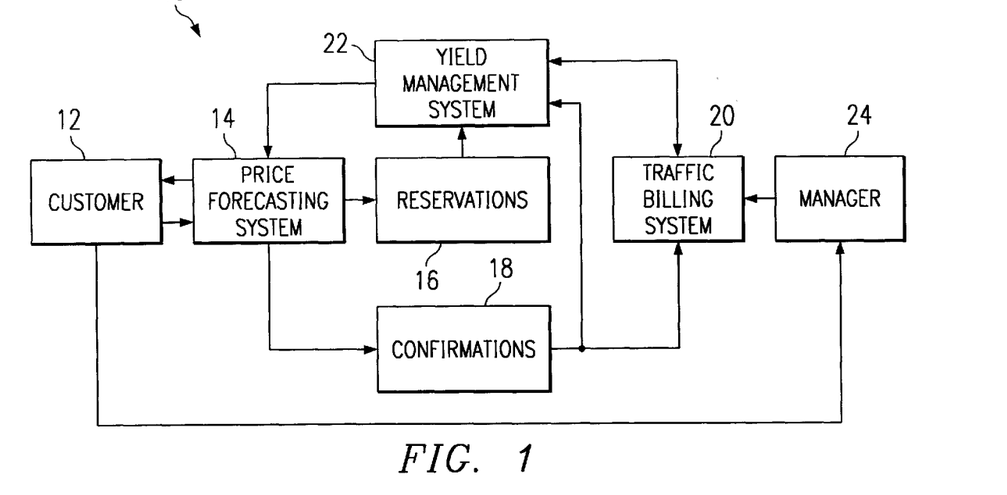
FIG. 1 is a block diagram of an integrated inventory management system according to the invention.

FIG. 1 illustrates a system diagram of an integrated inventory management (IMS) system 10 according to the invention. When a customer 12 requests a quotation for media advertising time, the sales person uses a price forecasting software system 14 to calculate the prices to be quoted to customer 12. Price forecasting system 14 ideally should have the most current prices for each time block or slot available at the time of purchase for quotation to that new potential customer 12. When customer 12 has made a purchasing decision, that decision will result in either a firm order (confirmation 18) or a reservation 16 (tentative order). In response to a firm order, a written confirmation 18 is generated by the yield management system (or traffic billing system) and mailed 8 to the customer, and the order information is electronically entered into a traffic billing system 20 and a yield management software system 22. Yield management system 22 immediately recalculates time slot prices, taking into account the most recent order, and sends updated values to the price forecasting system 14 used by the sales person.

There is normally no need for a direct download of information from traffic billing system 20 to yield management system 22. However, changes entered directly by a manager 24 may be directly input into traffic billing system 20 due to circumstances such as last minute cancellations, "make goods", preemptions, rebookings or accidents. Under these circumstances, traffic billing system 20 exports booked data (orders) back to the yield management system 22 for comparison with the information sent by the yield management system 22 to the price forecasting system 14. This update comparison may be done each time traffic billing system 20 changes booking information, or periodically, and yield management system 22 may intermittently query traffic billing system 20 for changes in data. In the event of a conflict between the information sent by the yield management system 22 to the price forecasting system 14 and traffic billing system 20, the information from traffic billing system 20 overrides any information previously provided by the yield management system 22 to the price forecasting system 14.

Yield management system 22 preferably uses a demand curve approach to determining prices for purposes of future sales. According to the invention, where T is total commercial capacity by program and S is the amount of total commercial capacity sold by program, the difference A=T−S is the total amount of commercial capacity available for a particular program on a particular date. The price of a program normally increases as A decreases. $P_L$ represents the lowest possible price of a program, which occurs when A=T (S=0, or no commercial time sold). $P_H$ represents the highest possible price of a program, which occurs when T=S (or A=0). Where the value of A=T, the initial, lowest price $P_L$ is determined by the yield management system, or defined by the user. As time is sold and the value of A moves from T and approaches and in some cases reaches 0, the price for each successive sale 0, 1, 2, 3, ... N is determined by the relationship $P_N = P_L * F_N$, where $P_N$ is the price for sale N and $F_N$ is a multiplier that starts at 1.0 before the first sale and has a value which generally increases as A approaches 0.

Figure 2:
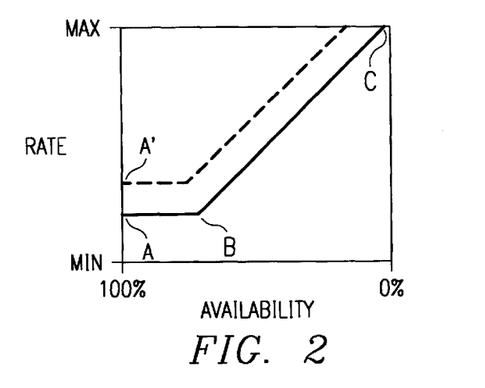
FIGS. 2, 3 and 4 are sample demand curves according used by a yield management system of FIG. 1.
Figure 3:
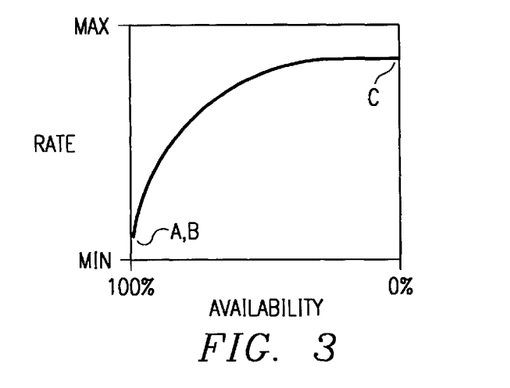
Figure 4:
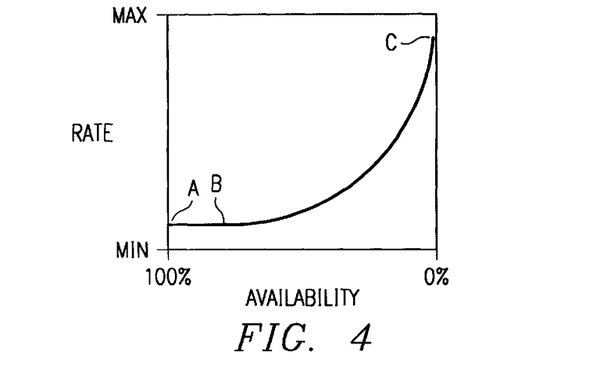

The manner in which $F_N$ changes depends on the demand curve or other pricing strategy applicable to the particular program. Three of the most common curves are shown in FIGS. 2 to 4. In FIG. 2, which is most often applicable to daytime programs with normal or average commercial time demand, a first segment of the curve is flat (no change in $F_N$ from 1) and at a predetermined sale (in this example, where availability=70%), the demand curve becomes linear and increases in even increments as additional time is sold, resulting in a steady increase in price $P_N$. FIG. 3 illustrates a parabolic demand curve often applicable to highly differentiated programs with a relatively small amount of total time available and normal to high popularity among advertisers. FIG. 4 shows a hyperbolic demand curve typical of a program with a large amount of available commercial time and relatively low demand. In all cases, $P_H = P_L * F_H$, i.e., the highest possible price $P_H$ is a function of the starting price $P_L$ and the demand curve or equivalent function which determines the highest multiplication factor $F_H$. Accordingly, in a preferred method of the invention, the step of generating prices for customer price quotations uses a function having the general formula $P_H = P_L * F_H$, where $P_H$ is the final price when 100% of inventory associated with the formula has been sold, $P_L$ is the starting price when 0% of the inventory has been sold, and F is a function that determines the applicable price at inventory levels between the starting and final prices, $F_H$ representing the value of function F when 100% of inventory has been sold.

For purposes of generating demand curves such as the ones shown in FIGS. 2–4, a set of predetermined demand curves may be used, and each program or time slot is classified according to one of the curve templates available. A starting price $P_L$ is determined for each by a managerial business judgment, or by working backwards iteratively from an overall budget goal. For example, given the budget goal and the applicable demand curves for what the station has to sell, across the board adjustments to $P_L$ are made which bring the total to the goal assuming a sufficient percentage of sales are achieved. This approach has the advantage of simplicity and ease of development. In the alternative, a demand curve which takes into account a wider range of economic factors that affect prices will be harder to develop, but has a better chance to optimize revenue. Either of these approaches may be used depending on the value the builder of the system attaches to these considerations.

In the second approach, demand curves are developed and updated based on actual prior sales information and information about the market the media property competes in. The Maxagrid™ software available from Maxagrid International, Inc. uses demand curves of this type based on historical station and market information and anticipated trends. Price forecasts extend as far as 52 weeks from current week, providing a pricing structure that guards against selling rates that are too low when large amounts of inventory are available. Starting rates too low can result in problems such as early sellout, preemptions, or being forced to price remaining inventory too high in a last-minute attempt to make budget goals, whereas improved forecasting of demand results in better inventory management and greater station revenues.

Referring again to FIGS. 2–4, point A marks the beginning rate by program with no inventory sold, B is the point at which the demand curve begins to increase, and C is the highest or ending rate at 100% sold. The starting rate A is important because it influences all rates generated thereafter. A historic rate starting point A is generally used, and the entire curve may be shifted later by adjusting point A up and down to the extent that the demand curve results in under or overselling of time for the associated program. As explained further below in connection with seasonality, point A is often increased by a percentage or dollar value reflecting the premium value associated with a season, and then shifted back to its original position when the season is over. See, for example, point A and the dashed line curve in FIG. 2.

The second key point on the curve is B, the percentage of inventory sold at which the rate starts to increase, which is usually greater than A but can equal A in a case such as that shown in FIG. 3. If historic demand has generally exceeded 100% for a particular program, the percentage at which the price starts to increase should be incrementally lower, and the opposite is true if historic demand has been less than 100%, for example:

| Demand % | Point B |
|---|---|
| Less than 54% | 50% |
| Between 55%–69% | 40% |
| Between 70%–79% | 35% |
| Between 80%–100% | 30% |
| Between 101%–111% | 25% |
| Between 112%–125% | 20% |
| Between 126%–144% | 15% |
| More than 145% | 10% |

A similar analysis may be made of demand on specific days of the week, and point B may be shifted accordingly on specific days where demand is lighter or heavier.

As noted above, the curved portion of the demand curve spanning points B and C may be linear, hyperbolic, parabolic or a combination of such functions, either as a true compound quadratic equation or by using different equations in different availability ranges, so that one picks up where the other leaves off. A number of factors may be taken into account in determining a quadratic rate equation(s). As noted above, the nature of the program itself will have a large effect on the curve parameters, i.e., a popular versus unpopular program in a frequently viewed or seldom viewed time slot. The total advertising time available will also have a strong influence in that rates will increase more rapidly when the amount of time is limited (large capacity versus small relative to other programs and competition). The opposite will be true when there is a lot of time to be sold, and this may be reflected in an increase in the distance between points A and B. In general, the demand curve should begin small incremental rate increases as soon as it is possible to do so, because across many programs these small increases add up to a large increase in revenue. Overall market factors may also affect the demand curve parameters, for example, the magnitude of the increase, or overall difference between A and C, will be influenced by the relatively availability of competing substitutes, and a more competitive marketplace will tend to reduce the difference between A and C.

A skilled, experienced sales manager that is familiar with the economic principles underlying broadcast revenues can design demand curves based on business experience rather than an exhaustive analysis of economic factors, and such a curve may perform as well as one developed to take into account a multitude of specific economic factors. This can be accomplished by close adherence to sound economic principles and station management practices such as those set forth in *Pricing & Rate Forecasting Using Broadcast Yield Management*, B. Shane Fox, published by the National Association of Broadcasters, 1992, and *Broadcast Revenue Management: Pricing Inventory Management in Today's Broadcast Environment*, B. Shane Fox, published by the National Association of Broadcasters, 1997, the contents of which are incorporated by reference herein. For example, creating and updating meaningful demand curves requires keeping accurate records of each salesperson's claimed and actual performance on a sale-by-sale basis, rather than as a vague prediction that the salesperson will sell X$ to his or her customers within the next two weeks. Meetings are held at regular intervals so that prices can be revised in response to changing conditions. Past selling patterns are evaluated and tracked in a manner that tends to raise prices and decrease demand for historically oversold time segments, and lower prices and thus increase demand for undersold time slots. Seasonal and day of the week variations are taken into account. The end result should be an effective demand curve given the circumstances of the individual business concern, which vary widely such that no one approach is optimum in all circumstances. Changes in the demand curves are reflected by corresponding changes to the data files accessed by yield management system 22.

Yield management system 22 used in the present invention may take into account a variety of specific demand factors. One important factor is the effect that seasonality has on demand forecasting. Seasonality is evaluated by looking at historical market revenue by month as well as station revenue by month. This establishes the initial rate on the demand curve at 0% sold, or 100% commercial availability. Typically every month and, indeed, certain weeks within a month, have completely different rates at 0% sold largely due to this factor for the same program or time segment. During the holiday season, for example, the shape of the demand curve may not change but the starting point and hence the entire curve is shifted upwardly for the duration of that season, and then returns to its former level when the season ends, as noted above for the dotted curve in FIG. 2.

The yield management system may take into account a variety of demand factors related to the market the station is in to better forecast future prices for program offerings and supply. These demand factors include information about the market in which that station competes, information about the station itself, and development of a historical availability profile (default traffic model) for each program based on recent past experience. The first category includes total advertising market revenue for the past several years, broken down by medium type (radio, TV, direct mail, etc.), total market revenue by month for the media type in question, such as radio, the predicted growth of total market revenues over the next three years, total and individual promotional expenses for the medium, market historic cost per point or cost per thousand for demographic listener/viewer age groups, and monthly variations in cost per point or thousand if more than 10%. Ideally, such market information should include all of the TV, cable and radio stations in the market, along with an identification of the format for each such media property, if applicable.

Percent of advertising revenues by media category establishes the level and degree of media differentiation with a particular market. An example would be radio revenues as a percentage of total advertising revenues, typically anywhere from 8 to 20% depending upon the market. This demand factor assists in the quantification of the amount of inventory to be opened up for discount, as well as the initial rate of increases in the demand curve (slope function determination). If, for example, radio revenues are a large fraction of total advertising revenues, a smaller amount of inventory can be made available for sales to discount buyers, discussed further below. If radio revenues are a smaller fraction of total advertising revenues, the slope function of the demand curve would increase more slowly as inventory is depleted on the theory that a more rapid price increase is more likely to drive a potential buyer off to some other form of advertising.

Buyer group and rate classes and categories determine the degree of price sensitivity for a particular station. Rate classes shifts the demand curve either up or down depending upon the degree to which the buyer or rate category is price sensitive. Historical rate ranges and commercial availability by program or time segment as related to historical revenue contribution affect the shape of the demand curve (i.e. hyperbolic or parabolic) or a combination thereof, as well as the rate range associated with the particular program.

For the individual station, the demand curve should take into account factors including historic gross revenue by month for the last three years, the percentage of revenues attributable to local ad agencies, national ad agencies, and local retail sales, the percentage of the station business that is based on a definitive volume or schedule commitment for one year's time, the size, experience and skill level of the station's sales staff as compared with competitors, relative demand by day of the week, relative demand by mutually exclusive programs and time segments (e.g., for radio, morning drive, midday, afternoon drive, evenings, overnight, etc.), total commercial units and total minutes available for sale in each program or time segment, total station commercial capacity by units and minutes, indicated daily up to annually, and historic low, normal and high clearance rates for each program or time segment given by month. Where possible, it is also useful to take into account the percentage of yearly revenues per program or time segment attributable to local ad agencies, national ad agencies, local retail sales, and the percentage sold to each on an annual basis as discussed above.

The default traffic model, or historic demand profile, is developed by completing a matrix of future weeks from 2 to 52 weeks into the future cross-referenced against days of the week and estimating a sellout percentage for each day. This factor quantifies the occasion and duration of inventory spoilage, as well as oversell. Knowing the of a particular program's oversell and history allows for the generation of factors which are applied to initial rate at 0% sellout and the highest rate associated with the program before the incidence of turn-aways or customer denials, with the purpose of adjusting the historic in accordance with other demand curve factors so that, in an ideal case, 100% sellout will occur without turn-aways or customer denials.

Figure 5:
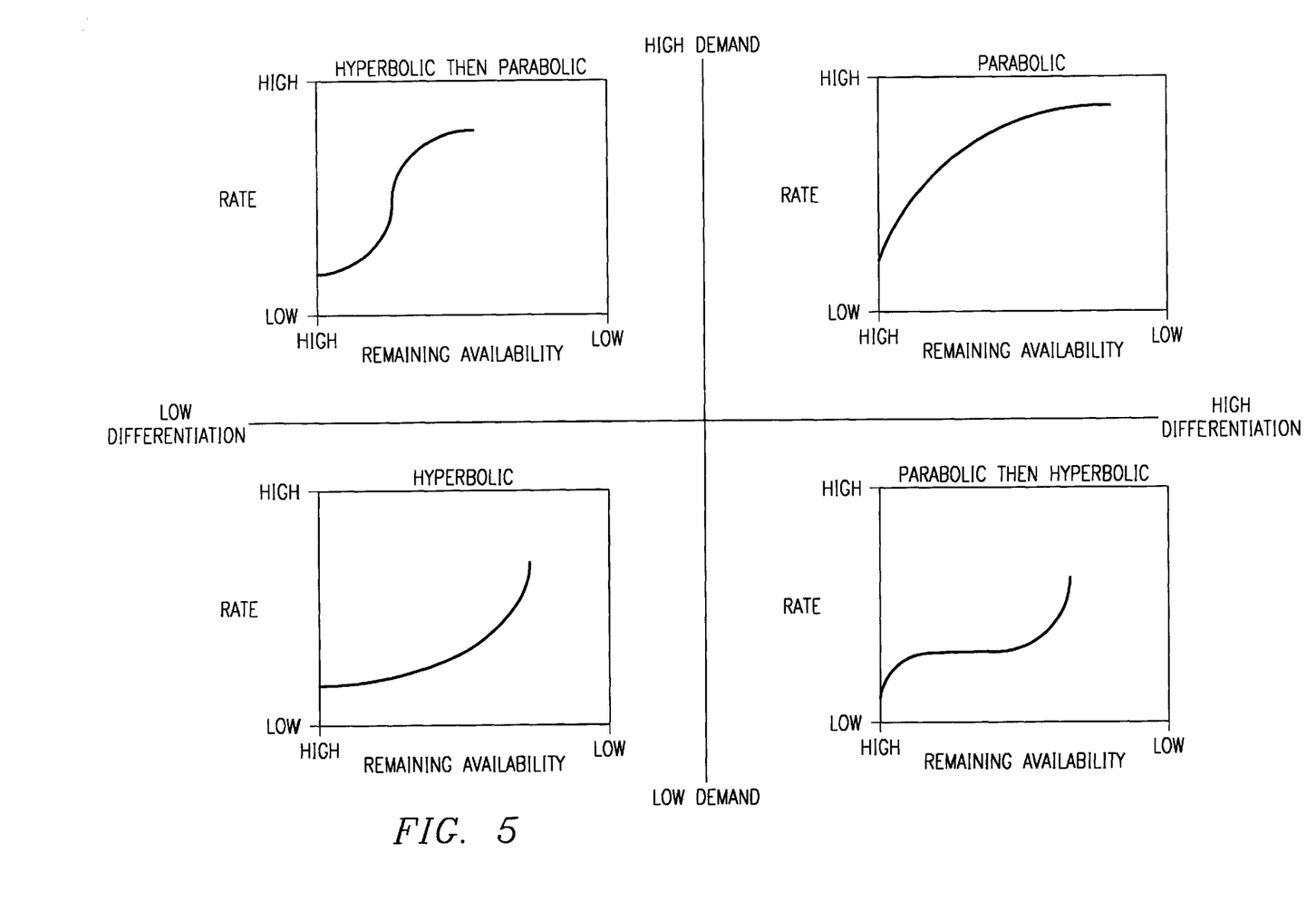
FIG. 5 is a four quadrant plot of demand versus differentiation illustrating four demand curves associated with each quadrant.

Degrees and levels of program differentiation and the effect that total market/station demand has on the type of demand curve generated by a yield management system in broadcast are illustrated in FIG. 5. Differentiation indicates the degree to which a program has recognition and popularity for advertising purposes relative to other market or station program offerings. Overall station or market demand indicates the overall supply vs. demand ratio for advertising time. In conditions of both high differentiation and high demand, a parabolic demand curve function is used as shown in the upper right quadrant. With high differentiation but low demand, a parabolic demand curve function is followed initially, though its amplitude will be less, and then a hyperbolic curve takes over, showing the effect of overall demand softness on an other wise popular program. High demand but low differentiation (upper left) represents the opposite pattern, wherein the curve starts out hyperbolic but then becomes parabolic, passing through a transition point at an intermediate demand level where the rate increases drastically. In conditions of both low differentiation and low demand, a hyperbolic demand curve function is used as shown in the lower left quadrant.

Demand curves such as these are used by the yield management system and price forecasting system in order to determine an inventory utilization index (IUI) which selects and ranks programs for sale by the salesperson in response to the customer's inquiry as described in U.S. patent application Ser. No. U.S. Ser. No. 09/143,586, filed Aug. 31, 1998, the contents of which are incorporated by reference herein. The customer usually selects program ad times according to the IUI list, and the resulting order or reservation causes an update to the yield management system data. The change in availability is noted so that the next sale for that program is made at the next higher increment of percent availability along the demand curve.

The yield management system also may implement rules or quotas determined by the station. For example, some types of revenues may require a targeted analysis over an entire year to even out oversold and undersold periods and maximize total revenues. Discount advertisers, for example, present a particular challenge in that they tend to purchase large amounts of commercial time at discounted prices. See, e.g., *Broadcast Revenue Management*, cited above, pages 35–38. As described therein, an IUI analysis of the discount advertiser segment is made. The result for each month is the percentage of total inventory used by discount advertisers divided by the percentage of total revenue generated by discount advertisers. If such inventory represented only 10% of May's total revenues but used 20% of May's inventory, the discount advertiser IUI ratio for May would be 0.5. The lower the ratio, the less revenue the station is getting in comparison to sell the same time to other advertisers at non-discounted prices. The percentage of preemptions and oversells reflects the total amount of time that month that had to be preempted (a reservation of one customer is canceled and replaced by another customer's) or was oversold (business that had to be turned away because the requested time was sold out and unavailable).

The manager then determines months where the occasion and duration of preemptions and oversells as a percentage equal or exceed 10% and the discount advertiser IUI index is less than 1. In these months, it is determined for future planning purposes to place limits on the total amount of time available for discount advertising. Other measures for controlling the situation include limiting, restricting or making unavailable to discount advertisers certain programs or time segments consistently in high demand, establishing an advanced booking requirement such as 10–14 days for changes or cancellations to obtain discounted rates, applying a 5 to 10 percent service charge for changes to a discounted rate, establishing a quota or maximum number of ads allowed for every discount advertiser by month, with the condition that extra time booked beyond that limit is at normal rates, and establishing blackout periods for discount advertising. Measures such as these may be used in other situations as well in which the relative value of booked business may not be as great as the value of business that was turned away.

Committed effective station management is essential to making the present invention work. Having established rules ands demand curves to generate prices for future inventory, the inevitable exceptions where the actual price departs from the forecast given by the price forecasting system must be carefully monitored and minimized, since these will generally tend to reduce the effectiveness of the system.

Figure 6:
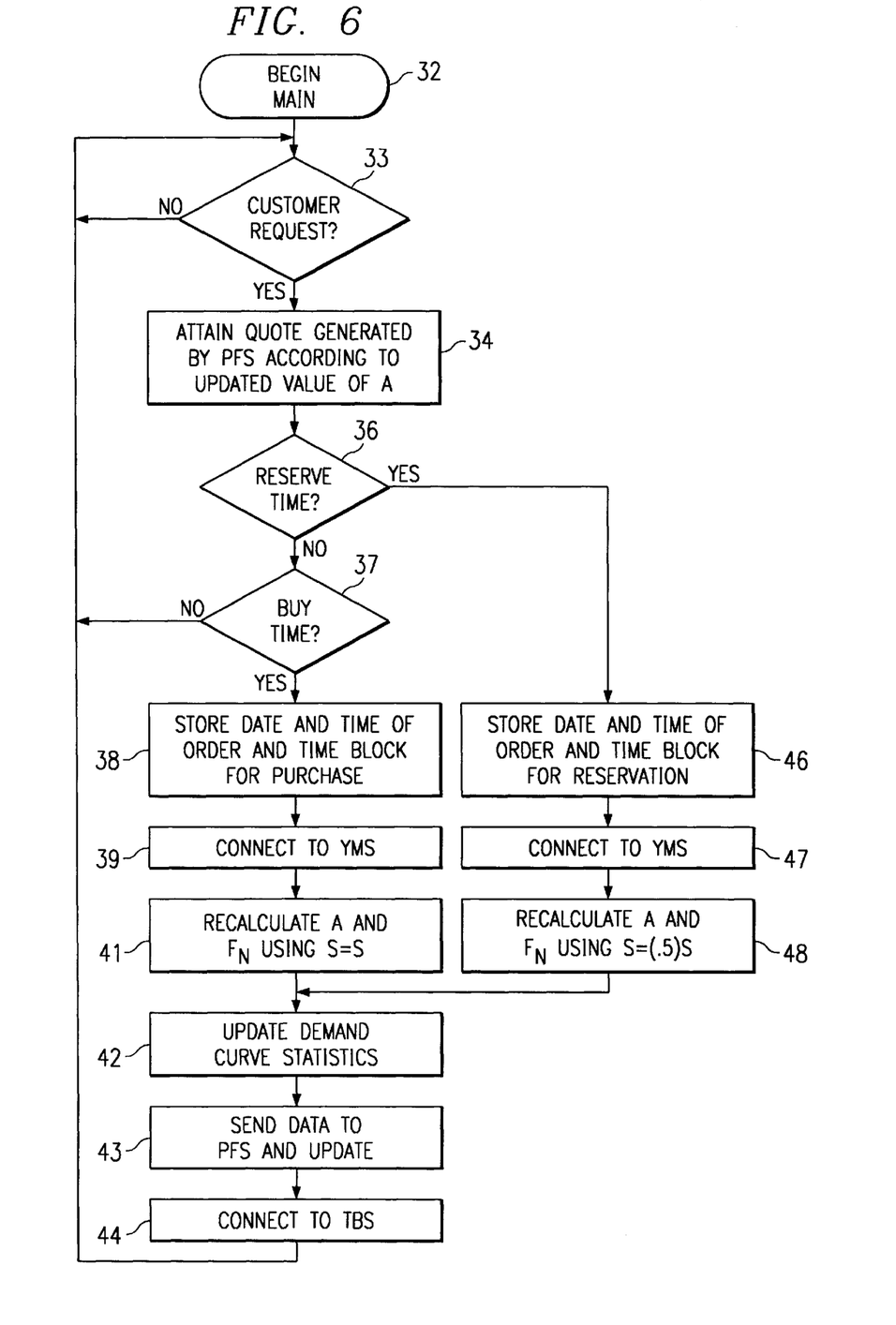
FIG. 6 is a schematic diagram of a price forecast update process according to the invention.

Prices for use in customer forecasts using the rules and demand curves implemented by the yield management system should be recalculated on a frequent basis, ideally whenever a transaction resulting in a reservation or confirmation occurs. FIGS. 1 and 6 illustrate the process by which the recalculation takes place. After startup 32, it is determined at a decision 33 whether the customer wishes to request a rate quote. If not, the process resets. If so, the price forecasting system generates a quote at step 34 and the salesperson and customer negotiate scheduling. For this purpose, as discussed further in connection with FIGS. 9 and 10, price forecasting system 14 creates a table or menu, either as a printed copy screen display, of available time slots and associated prices from which the customer can choose.

If the customer decides to buy time rather than merely reserve it at a decision 36, the system proceeds through decisions 36 and 37 to a step 38 wherein the date and time of the purchase, the time block or segment sold, the price, the sales information for the customer, and other customer sales information is entered into the price forecasting system 14 to be forwarded to the yield management system 22 and traffic billing system (TBS) 20 (see FIG. 1). Upon connecting to the yield management system at step 39 and imparting the relevant information, yield management system 22 recalculates A and $F_N$ based on the amount of time sold S at step 41. Demand curve statistics, namely the applicable percent availability, are then updated at step 42, and the update is sent to the price forecasting system (PFS) 14 at step 43. Finally, at step 44, the price forecasting system 14 connects to the traffic billing system 20 and the accounting, scheduling and processing information are entered for that sale. The process then resets and returns to start waiting for the next customer inquiry 33.

The process is mostly the same if the customer decides to reserve time (yes at decision 36) rather than place a firm order that gives rise to a confirmation 18 as discussed above. Steps 46 and 47 proceed in the same manner as the corresponding steps 38 and 39. If customer 12 opts in favor of a reservation instead of a firm order, then such information is entered as a reservation 16 instead of a confirmation 18. At step 48, which corresponds to step 41 for an order, A and $F_N$ are recalculated based on an amount of time sold S. Step 48 preferably comprises generating prices for price quotations using the function $P_H = P_L * F_H$, where $P_H$ is the final price when 100% of inventory associated with the formula has been sold, $P_L$ is the starting price when 0% of the inventory has been sold, and F is a function that determines the applicable price at inventory levels between the starting and final prices, with $F_H$ representing the value of function F when 100% of inventory has been sold. The weight assigned to orders and reservations affects the inventory level used by the function F in generating a price for the next price quotation to be generated.

Each reservation has a percent chance of maturing into an order, and applying the probability of an order being placed to the pricing forecast will enhance the accuracy of the pricing forecast. Thus, in the simplest model, a reservation with a historic probability of 50% will have only have half the effect on a pricing forecast that an identical order would have, and thus S is multiplied by 0.5 at step 48. The estimated probability may be entered manually by the salesperson, or may be determined by the system on a lookup table that contains probability estimates based on the specific customer's past track record, or for a new customer, the class the customer falls into (local ad agency, national ad agency, local retail, or discount.) It may be preferable to have a suggested probability generated by the system but give the salesperson the option of overriding the probability based on individual circumstances. After the recalculation is made, steps 42–44 are followed in the same manner as for an order. In this manner, the invention provides a more accurate prediction of actual future orders and revenues than would be possible by either not taking reservations into account at all in revenue projections, or else treating reservations as actual orders, which would err in the other direction.

An integrated system according to the invention optionally has the capability of earmarking or reserving specific times likely to be wanted by an advertiser, so as to ensure program access and availability. The yield management system upon receipt of the reservation recalculates A and subsequently a forecast $P_N$ given the new $F_N$ on that program's demand curve. In this way, the media property can also preserve its relationship with the advertiser by avoiding time slot conflicts which are a common problem in current industry practice. No availability causes program oversell and preemption which results in customer dissatisfaction and considerable inefficiency as station personnel spend time dealing with conflicts.

The systems and processes of the invention may be used by individual stations, but further advantages result from implementing the invention as part of a centralized enterprise revenue management system. In such a system, a headquarters location may automatically poll and receive an income forecast from integrated price forecasting and yield management systems of each media property, or may maintain a single integrated system which all member stations use through remote access.

Figure 7:
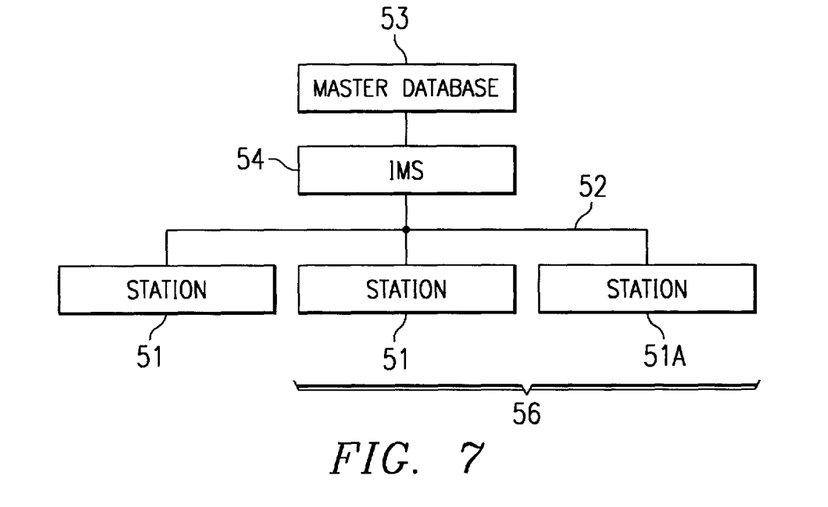
FIGS. 7 and 8 are schematic diagrams of two embodiments of an enterprise management system according to the invention.

FIG. 7 shows the latter type of system. Each station 51 has access to a network 52 such as the Internet, a local area network or a wide area network that maintains a master database 53 of time sales data for all member stations. For this purpose a basic Internet browser program with password access at a web site maintained by the headquarters location may be sufficient. Such a single, multi-station inventory management system 54 may, for example, permit selection by an individual station 51A, stations within one or more predetermined markets or geographic regions defined by a subgroup 56 of stations 51, or all stations within the enterprise. The following illustrates an IUI table ranking of programs from several stations KAAA, KBBB, KCCC as an example of how programs from multiple stations can managed in the same manner as a program from a single station:

| Station/Daypart | IUI Rank |
|---|---|
| KAAA-FM 10a–3p M-F | 1 |
| KAAA-FM 6a–10a Sat | 2 |
| KBBB-FM 6a–10a M-F | 3 |
| KCCC-FM 3p–8p M-F | 4 |
| KBBB-FM 10a–3p M-F | 5 |
| KDDD-FM 3p–8p M-F | 6 |
| KBBB-FM 10a–3p Sat | 7 |
| KCCC-FM 10a–3p Sun | 8 |
| KDDD-FM 6a–10a M-F | 9 |
| KAAA-FM 10a–9p Sun | 10 |

The table includes identification of both the time slot and the originating station, ranked competitively by IUI, and the column for IUI rank lists the selected slots in ranked order, as shown, or by actual IUI. The table may further select for stations of a particular type or media format within the enterprise, such as news stations, country and western stations, religious stations, or the like.

Figure 8:
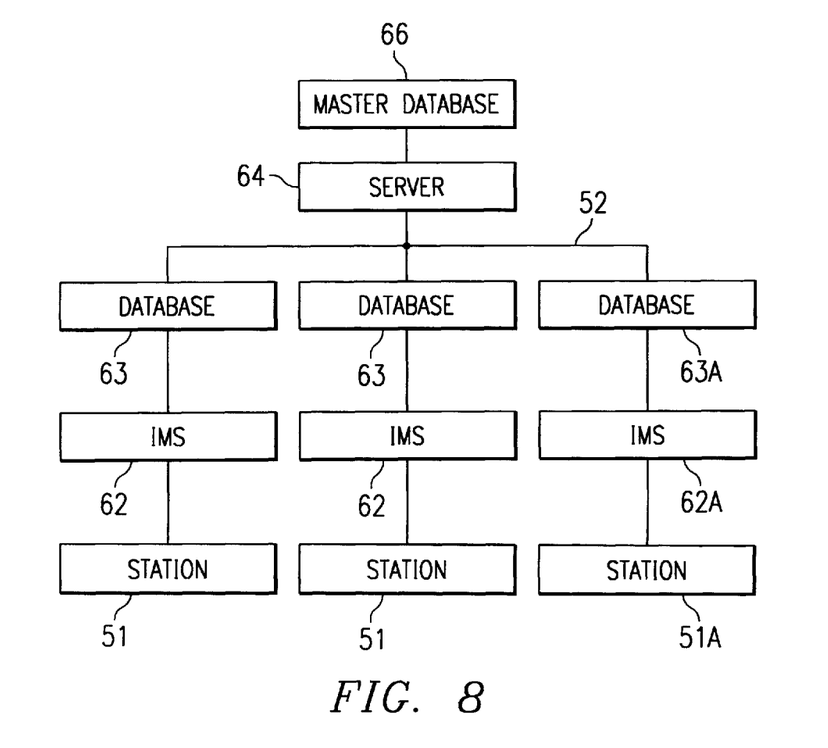

Referring to FIG. 8, a multi-station system may also be structured as a number of stand-alone inventory management systems 62 and databases 63, one for each station 51, which communicate with a central server 64 through a network 52 to maintain a master database 66. Master database 66 mirrors the contents of each of the individual databases 63 and is updated either periodically or whenever a database 63 is updated. When a request for time is received at station 51A that requires access to time data from other stations 51, system 62A receives this data from database 66 through network 52. In the event of network failure, stand alone inventory management systems 62 can continue functioning to sell time for each respective station 51. Real time updating of master database 66 is desirable to prevent potential errors due to a time lag between a change in a local database 63A indicating a sale and updating of master database 66, which will be accessed by other yield management systems 62 seeking to list, and possibly sell, a time slot of a station 51A which corresponds to database 63A. In this case, each station 51 has its own inventory management system 62 which it can take with it if the station is sold and leaves the enterprise. A hybrid system is also possible wherein each station 51 has its own price forecasting system software which accesses a common yield management system and traffic billing system through the network. This option may prove advantageous in that the price forecasting system provides the user interface function and can operate on a standalone in a situation where pricing data revisions from yield management system 22 is unavailable.

Figure 9:
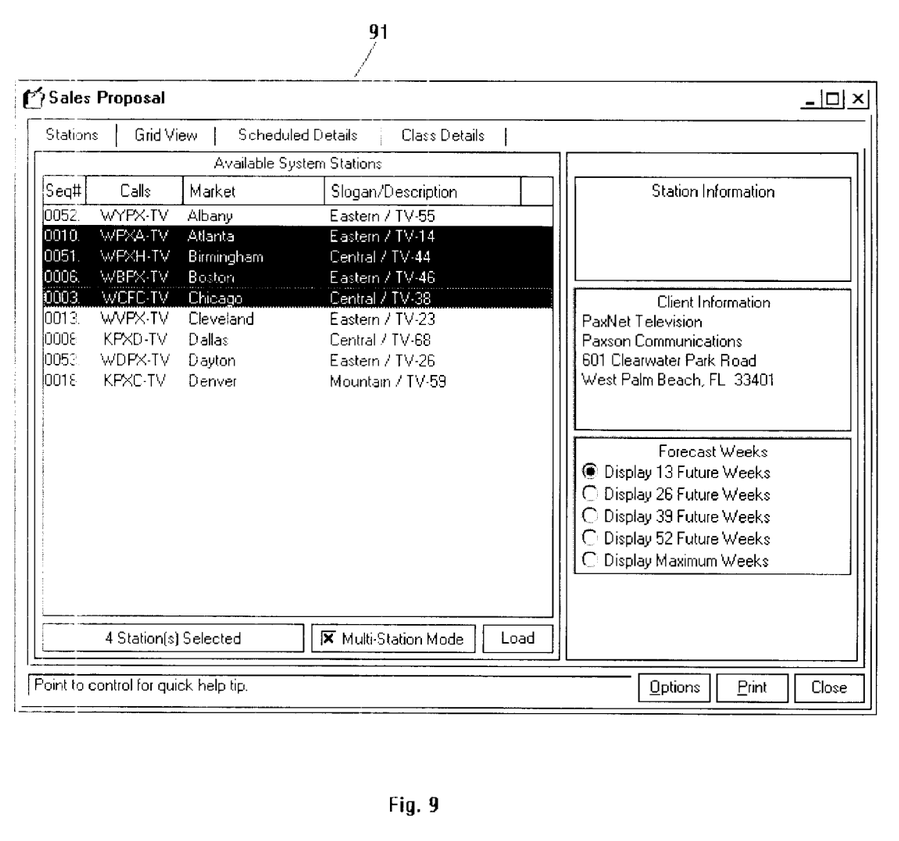

FIGS. 9 and 10 illustrate one possible layout of screens for a multi-station inventory management system in which a basic sales proposal screen 91 which is called from a master menu lists a series of stations that satisfy the criteria entered by the salesperson in response to the customer's request, in this illustration markets from A to D. The salesperson highlights several entries of interest and generates an additional screen 92, in which specific time slot pricing information for each station for each day of the week is present in a table so that one or more specific choices can be made. Side by side price comparisons are possible. The information which actually appears on the second screen 92 may be limited by time slot, price range, or like factors. Obviously, there are many ways in which such information could be conveniently presented, but a hierarchy of screens which become progressively more specific as shown is most preferred.

There will be a distinct advantage for multiple market stations, via consolidation, to implement consistent revenue management structures across their many outlets. Other industries have utilized revenue management principles quite effectively in terms of the increased amounts of actionable management information possible with consistent inventory management and pricing processes across multiple outlets. A revenue management system according to the invention can provide a corporate manager with information showing remaining availabilities instantaneously across multiple stations and multiple markets. Additionally, a inventory and revenue management system as described herein provides an opportunity for group managers to do a better forecasting job since they now have access to remaining commercial availability information across multiple markets and stations. The system of the invention can not only ascertain availabilities across multiple stations and multiple markets, but also determine the remaining revenue potential for those remaining availabilities, again across multiple markets and stations.

There are a number of important benefits that revenue management using an integrated system according to the invention holds for the industry. Clearly the biggest benefit is that it provides opportunities to support revenue based pricing and makes the overall pricing process easily accessible from an information standpoint. Salespeople regardless of location can access pricing and inventory information instantaneously. A salesperson can now retrieve remaining availabilities and a price quote for any program/daypart for one year in advance, given total demand on that particular program/daypart.

Since instantaneous pricing decisions based upon revenue management can be made, profit-oriented performance measurements, commissions and incentive programs based upon performance now can be implemented. Commission programs provide an opportunity for marketing people to focus on the optimization of inventory. In accordance with a further aspect of the invention, salespeople using the system are paid a percentage of a known margin or net profit, and sales abuses such as excessive sales to discount advertisers can be avoided by the means discussed above, even where salespeople would normally be motivated to make a sale to a large discount advertiser that is not in the best overall interest of the station. Salespeople will be able to yield-manage each individual availability request, allowing tremendous benefits to the media property from a margin contribution standpoint while at the same time satisfying a particular buyer's needs.

A revenue management system according to the invention provides a consistent structure within a sales organization. Salespeople, regardless of location, can access computer networks with customized revenue management systems by market. These systems will provide rate quotes predicated by the total customer demand for any and all types of station combinations. Such a system also permits increased industry consolidation, so that the broadcasting industry can perform like many other industries that have focused on revenue management practices, rather than as a multitude of small businesses each with its own revenue management approach. Whenever a company has many different brands under single ownership and an integrated system such as the one according to the invention in use, benefits such as one stop shopping, cross selling, larger market coverage, different brands under single ownership, and shared market intelligence follow. One stop shopping and cross selling take place as different sales structures are implemented across groups utilizing common revenue management programs. Marketing personnel for a particular station or station groups are able to access multiple programs, multiple brands either in the same or different markets, optimizing available inventory instantaneously. Another benefit focuses on market intelligence and the prospects for adjusting inventory control and pricing parameters across multiple brands, multiple formats and multiple programs across different markets. A revenue management system as described herein automatically adjust pricing parameters and cascades the results across multiple stations/markets virtually instantaneously, given different demand patterns across different formats and programs. This allows for inventory optimization routines to be applied across multiple stations and programs.

Definite market segments within broadcasting have varying price elasticity. Simply stated, different customers have a different ability to pay at different times, given their own unique needs. Without a revenue management system, such opportunities will often be squandered. There is predictable demand by season and by advertising segment for broadcast. An integrated system according to the invention provides a way to quantify that demand in terms of forecasting different price points within a particular segment. This allows for the ability to predict changes in demand at different price points, as well as provide the opportunity to optimize inventory for different programs across multiple stations and markets. Consolidation has allowed information technology, through a revenue management program, to take advantage of the new environment. The entire process is transparent to the customer, and that is well as long as the customer is presented with different options and alternatives that meet the customer's needs. Schedule negotiations that benefit both the station and the customer are now truly possible, i.e., less time is spent haggling over price and more time is spent selecting among the choices offered to find the right time slot. The present invention provides these benefits.

Whereas the invention has been described with respect to specific embodiments thereof, it will be understood that various changes and modifications will be suggested to one skilled in the art and it is intended to encompass such changes and modifications as fall within the scope of the appended claims. For example, alternative computational methods for reaching the end results described above are equivalents within the scope of the invention. The invention is not limited to time management and may be applied to other types of inventories with similar characteristics, for example, workload management wherein it is desired to assign a new project of a given size or duration to one of several individuals or groups having varying capacity, or advertising space in newspapers. Similarly, the multi-station systems according to the invention may create reports or tables using criteria other than the IUI ratio.

While components such as the price forecasting system, yield management system and traffic billing system have been depicted for ease of explanation as separate software modules that exchange information either directly of by means of uploadable data files, these functions could of course be provided in a single software program with subroutines for performing the functions indicated. Where these program modules can access a common memory, the steps of sending information from one module to another may amount to simply updating the values of variables in one section of memory and then accessing the updated variables with another module within the program. These and other alternatives are within the scope of the claims which follow.

What is claimed is:

1. A computer-implemented inventory management system for an enterprise which includes a number of member stations, each member station being a separate business entity having a geographic location and a market area, and having associated advertising inventory for sale, wherein the inventory comprises segments of advertising time associated with future time periods, comprising:

price forecasting program logic that generates a visually viewable table of one or more advertising time segments that meet specified customer request criteria;

yield management program logic for generating and maintaining advertising time segment inventory pricing information for use by the price forecasting system in accordance with a pricing strategy;

traffic billing program logic for generating confirmations of orders for inventory and for maintaining scheduling, processing and accounting information in data files relating to such orders;

a network permitting access to time segment inventory pricing information of multiple member stations; and a system for accessing inventory information of multiple stations in response to a customer request so that the table of inventory time segments generated by the price forecasting program logic that meets the specified customer criteria can include inventory items from some or all member stations which meet such criteria.

2. The inventory management system of claim 1, wherein the member stations are media properties.

3. The inventory management system of claim 2, wherein each station has a name and an associated geographic area in which it delivers media programming to consumers, which programming has associated advertising time segments.

4. The inventory management system of claim 3, wherein the system for accessing inventory information of multiple stations in response to a customer request further includes program logic for generating a table of available time slots and dates, and includes a price quotation for each time slot on each date.

5. The inventory management system of claim 1, wherein the member stations include radio stations.

6. The inventory management system of claim 1, wherein the member stations include television stations.

7. The inventory management system of claim 1, wherein the table of inventory that meets the specified customer criteria comprises a computer printout or screen display that lists a time slot having available advertising time and the name of the member station offering the advertising time.

8. The inventory management system of claim 1, wherein the network permits a computer at each station to access inventory data for other member stations.

9. The system of claim 8, wherein the network permits each station to access a master database of inventory data for all member stations.

10. The system of claim 9, wherein the master database is stored at a headquarters location for the enterprise.

11. The system of claim 1, wherein the system for accessing inventory information of multiple stations in response to a customer request further includes stand-alone inventory management systems and associated data files at each station which are accessed by other stations through the network.

12. The system of claim 1, further comprising means for accessing traffic billing information in order to generate a revenue projection for some or all member stations.

13. The system of claim 12, wherein the network connects each station to a headquarters location at which the revenue projection is requested.

14. The system of claim 12, wherein the means for accessing traffic billing information includes means for determining projected future revenues for each selected station based on orders for advertising time recorded in traffic billing system data files.

15. A computer-implemented inventory management system for an enterprise, which includes a number of member stations, each member station being a media property having a name, a geographic location and an associated market area in which it delivers media programming to consumers, and having associated advertising inventory for sale, wherein the inventory comprises segments of advertising time associated with future time periods, comprising:

price forecasting program logic that generates a visually viewable table of one or more advertising time segments that meet specified customer request criteria, which table comprises a computer printout or screen display that lists a time slot having available advertising time and the name of the member station offering the advertising time;

yield management program logic for generating and maintaining advertising time segment inventory pricing information for use by the price forecasting system in accordance with a pricing strategy;

traffic billing program logic for generating confirmations of orders for inventory and for maintaining scheduling, processing and accounting information in data files relating to such orders;

a network interconnecting computers located at different member stations, which network permits access to time segment inventory pricing information of multiple member stations by each member station; and a system for accessing inventory information of multiple stations in response to a customer request so that the table of inventory time segments generated by the price forecasting program logic that meets the specified customer criteria can include inventory items from some or all member stations which meet such criteria.

16. The inventory management system of claim 15, wherein the member stations include radio stations.

17. The inventory management system of claim 15, wherein the member stations include television stations.

18. The inventory management system of claim 15, means for accessing traffic billing information in order to generate a revenue projection for some or all member stations by determining projected future revenues for each selected station based on orders for advertising time recorded in traffic billing system data files.

19. The inventory management system of claim 15, wherein the system for accessing inventory information of multiple stations in response to a customer request further includes program logic for generating a table of available time slots and dates, and includes a price quotation for each time slot on each date.

* * * * *